United States Patent
Zhang et al.

(10) Patent No.: US 7,321,625 B2
(45) Date of Patent: Jan. 22, 2008

(54) WAVELET BASED MULTIRESOLUTION VIDEO REPRESENTATION WITH SPATIALLY SCALABLE MOTION VECTORS

(75) Inventors: Huipin Zhang, Milpitas, CA (US); Frank Jan Bossen, San Jose, CA (US)

(73) Assignee: NTT DoCoMo, Inc., Tokyo (JP)

( * ) Notice: Subject to any disclaimer, the term of this patent is extended or adjusted under 35 U.S.C. 154(b) by 780 days.

(21) Appl. No.: 10/318,802

(22) Filed: Dec. 13, 2002

(65) Prior Publication Data

US 2004/0114689 A1 Jun. 17, 2004

(51) Int. Cl.
- H04B 1/66 (2006.01)
- H04N 7/12 (2006.01)
- H04N 11/02 (2006.01)
- H04N 11/06 (2006.01)

(52) U.S. Cl. .............................................. 375/240.11
(58) Field of Classification Search ................ None
See application file for complete search history.

(56) References Cited

U.S. PATENT DOCUMENTS

| | | | |
|---|---|---|---|
| 6,347,157 B2* | 2/2002 | Chui | 382/240 |
| 6,674,911 B1* | 1/2004 | Pearlman et al. | 382/240 |
| 6,782,051 B2* | 8/2004 | Pesquet-Popescu | 375/240.11 |
| 6,907,075 B2* | 6/2005 | Felts et al. | 375/240.19 |
| 7,042,946 B2* | 5/2006 | Turaga et al. | 375/240.19 |
| 2002/0168007 A1* | 11/2002 | Lee | 375/240.03 |
| 2003/0133500 A1* | 7/2003 | Auwera et al. | 375/240.11 |
| 2004/0066849 A1* | 4/2004 | Van Der Schaar | 375/240.19 |
| 2005/0069212 A1* | 3/2005 | Bottreau et al. | 382/240 |

OTHER PUBLICATIONS

Andreopoulos, Yiannis et al., "Wavelet-Based Fully-Scalable Video Coding With in-Band Prediction", *Proc. 3rd IEEE Benelux Signal Processing Symposium* (SPS-2000), Leuven, Belgium, Mar. 21-22, 2002, pp. S02-1-SO2-4.

Bottreau, Vincent et al., "a Fully Scalable 3D Subband Video-Codec", Proceedings of *IEEE International Conference on Image Processing*, ICIP2001, vol. 2, Greece, Oct. 7-10, 2001, 4 pages.

(Continued)

*Primary Examiner*—Nhon Diep
(74) *Attorney, Agent, or Firm*—Blakely, Sokoloff, Taylor & Zafman LLP (57) ABSTRACT

Wavelet based multiresolution video representations generated by multi-scale motion compensated temporal filtering (MCTF) and spatial wavelet transform are disclosed. Since temporal filtering and spatial filtering are separated in generating such representations, there are many different ways to intertwine single-level MCTF and single-level spatial filtering, resulting in many different video representation schemes with spatially scalable motion vectors for the support of different combination of spatial scalability and temporal scalability. The problem of design of such a video representation scheme to full the spatial/temporal scalability requirements is studied. Signaling of the scheme to the decoder is also investigated. Since MCTF is performed subband by subband, motion vectors are available for reconstructing video sequences of any possible reduced spatial resolution, restricted by the dyadic decomposition pattern and the maximal spatial decomposition level. It is thus clear that the family of decomposition schemes provides efficient and versatile multiresolution video representations for fully scalable video coding.

23 Claims, 8 Drawing Sheets

OTHER PUBLICATIONS

Bottreau, Vincent et al., "Architecture and features of a fully scalable motion-compensated 3D subband codec", publication from *International Organization For Standardization* ISO/IEC/JTC1/SC29/WG11/M7977, Mar. 2002, pp. 1-23.

Choi, Seung-Jong et al. "Motion-Compensated 3-D Subband Coding of Video", *IEEE Transactions on Image Processing*, vol. 8, No. 2, Feb. 1999, pp. 155-167.

Hsiang, Shih-Ta et al., "Embedded Image Coding Using Zeroblockers of Subband/Wavelet Coefficients and Context Modeling", *ISCAS*, New York, 2000, located via the Internet at: <http://www.cipr.rpi.edu/publications/publications.html>, 4 pages.

Hsiang, Shih-Ta et al., "Embedded Video Coding Using Invertible Motion Compensated 3-D Subband/Wavelet Filter Bank", *Signal Processing: Image Communication*, vol. 16, May 2001, 10 pages.

Hsiang, Shih-Ta et al., "Invertible Three-Dimensional Analysis/Synthesis System for Video Coding with Half-Pixel-Accurate Motion Compensation", *in Proc. SPIE Conf. on Visual Communications and Image Processing*, San Jose, California, vol. 3653, Jan. 1999, pp. 537-546.

Kim, Beong-Jo et al. "An Embedded Wavelet Video Coder Using Three-Dimensional Set Partitioning in Hierarchical Trees (SPIHT)," *IEEE*, pp. 251-260.

Kim, Beong-Jo et al. "Very Low Bit-Rate Embedded Video Coding with 3D Set Partitioning in Hierarchical Trees (3D SPIHT)", *IEEE Trans. Circuits and Systems for Video Technology*, vol. 10, Dec. 2002, pp. 1-32.

Ohm, Jens-Rainer et al., "Three-Dimensional Subband Coding with Motion Compensation", *IEEE Transactions On Image Processing*, vol. 3, No. 5, Sep. 1994, pp. 559-571.

Pesquet-Popescu, Beatrice et al., "Three-Dimensional Lifting Schemes For Motion Compensated Video Compression", *IEEE*, 2001. pp. 1793-1796.

Turaga, Deepak, S. et al. "Reduced complexity spatio-temporal scalable motion compensated wavelet video coding", publication from *International Organization For Standardization* ISO/IEC JTC1/SC29/WG11/M9243, Awaji Isand, Dec. 2002, 6 pages.

Van der Schaar, Mihaela et al., "Fully Scalable 3-D Overcomplete Wavelet Video Coding using Adaptive Motion Compensated Temporal Filtering", publication from *International Organization For Standardization*,ISO/IEC JTC1/SC29/WG11/M9037, Shanghai, Oct. 2002, pp. 1-8.

Wang, Albert et al. "Three-Dimensional Wavelet Coding of Video with Global Motion Compensation", *IEEE*, 1999, pp. 404-413.

Zafar, Sohail, "Multiscale Video Representation Using Multiresolution Motion Compensation and Wavelet Decomposition", *IEEE Journal on Selected Areas in Communications*, vol. 11, No. 1, Jan. 1993, pp. 24-35.

Zhang, Huipin et al., "Universal Scalability and Fine Granular Scalability of Video Coding", internal publication of *DoCoMo USA Labs*, Report # ID 2002-87, Spring 2002, pp. 1-67.

Zhang, Huipin et al., "Wavelet Based Video Coding", internal publication of *DoCoMo Communication USA Labs*, Report # ID 2002-92, Jun. 2002, pp. 1-36.

Zhang, Y-Qin, "Motion-Compensated Wavelet Transform Coding for Color Video Compression", *IEEE Transactions On Circuits and Systems for Video Technology*, vol. 2, No. 3, Sep. 1992, pp. 285-296.

* cited by examiner

WAVELET BASED MULTIRESOLUTION VIDEO REPRESENTATION WITH SPATIALLY SCALABLE MOTION VECTORS

The present application relates generally to video coding. More particularly, the present invention relates to a wavelet based multiresolution video representation with spatially scalable motion vectors, and video coders employing such techniques.

1 Introduction

Video streaming applications require video coding technologies that provide flexible scalability of a single bit stream, allowing seamless integration of servers, heterogeneous networks, terminals, acquisition and storage devices with different characteristics in a multimedia framework as defined in activity and publications of the Motion Pictures Experts Group (MPEG) in connection with the standard MPEG-21. The so-called universal scalability of a video bitstream requires the flexible reconstruction from a single bitstream of video sequence of reduced temporal resolution, spatial resolution and/or quality resolution with fine granularity. It has been identified that scalability with high flexibility and arbitrary combination of spatial scalability, temporal scalability and signal to noise ratio (SNR) scalability is desired. In particular, transmission over variable-bandwidth networks, storage on a variety of media and operation of different-capability display devices would benefit from such functionality.

Conventional video coding processes have a hybrid motion compensation and direct cosine transform (DCT) coding architecture, and various types of scalability have been supported in the standards. The different types of scalability are achieved by layered video coding in these standards, and the approaches have not achieved the desired universal scalability due to the inflexibility of scalability and the sacrifice in coding performance.

Alternatively, technologies such as wavelet coding which inherently possess scalability features can be potential candidates to achieve the universal scalability, if their performance matches the state of the art. Wavelet transform has emerged as a tool for statistical signal, image and video processing. The wavelet domain provides a natural setting for many applications involving real-world signals, including estimation, detection, classification, compression and synthesis.

Wavelet coding has been a well-known image coding tool which results in highly scalable and extremely efficient image coders. The wavelet transform provides a natural multiresolution representation for digital image signals; it also has other important properties such as energy compaction, locality, decorrelation, edge detection, etc., which are all important for scalable image coding. There have been many approaches extending wavelet techniques from the image coding area to the video coding area since the early 1990's. There are also many MPEG contributions promoting wavelet video coding technologies in MPEG. Most of these approaches take advantage of the highly efficient energy compaction property of wavelet transform to exploit the spatial redundancy of images to achieve coding efficiency in video coding.

To exploit the interframe redundancy in video signals, a differential predictive coding technique is usually used in conventional hybrid motion compensation and transform coding processes. Recently, however, the wavelet transform has been used to effectively exploit the temporal redundancy or the interframe redundancy in video coding. The wavelet transform generates a multiresolution representation of video signals in both spatial direction and temporal direction which provides a natural and easy way to achieve spatial scalability and temporal scalability in video coding. In addition, fine granular scalability is easy to accomplish with wavelet based video coding without sacrificing coding efficiency. Recently, MPEG has created an Ad hoc Group (AhG) for exploration of new tracks in video coding in the area of interframe wavelet technology.

SUMMARY

The present work is related to various multiresolution video representations for scalable video coding with an emphasis on spatially scalable motion vectors. In order to address this problem, a new family of video decomposition processes are introduced; these processes utilize subband MCTF to generate multi-scale representations along the temporal direction. Since MCTF is performed subband by subband, motion vectors are available for reduced spatial resolutions, thus facilitating the support of spatial scalability by video coders that use the multiresolution representation in video coding.

The family of video decomposition processes is generated by intertwining single-level temporal filtering (MCTF) and spatial filtering. A different intertwining pattern results in a multiresolution video representation of support of scalable motion vectors for different combinations of spatial scalability and temporal scalability. Thus, a video coder with specified scalability requirements requires a specific video representation process which has to be designed. This paper studies the design of a multiresolution video representation based on scalability requirements. Techniques to transmit the designed video representation process to the decoder are also considered. The disclosed techniques are not restricted to any specific video coder; only the video representation processes for video coding are considered. With a video representation such as those disclosed herein, a video coder may code the representation coefficients with or without quantization and the coder may or may not use a bitplane coding technique. However, these techniques are not discussed herein.

The foregoing summary has been provided only by way of introduction. Nothing in this section should be taken as a limitation on the following claims, which define the scope of the invention.

DETAILED DESCRIPTION OF THE PRESENTLY PREFERRED EMBODIMENTS

Figure 14:
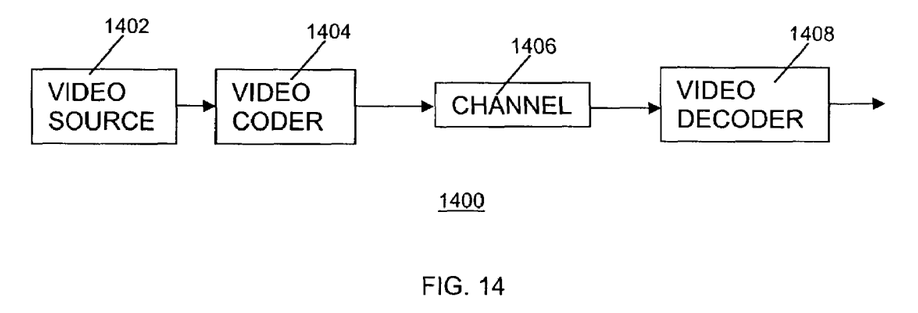
FIG. 14 is a block diagram of a video data communication system.

By way of introduction, FIG. 14 is a block diagram of a video data communication system 1400. The system 1400 includes a video source 1402, a video coder 1404 which communicates encoded video data over a channel 1406 to a video decoder 1408.

The video source 1402 may be any source of video data, such as a camera producing video data based on received images or a streaming data source such as a network location storing video data for remote access. The video source 1402 provides video data of any suitable format to the video coder 1404. The video source 1402 may also provide control information to the video coder 1404.

The video coder 1404 encodes the received video according to a selected encoding format. An exemplary video coder which may embody the video coder 1404 is the MPEG-4 video coding system. Any other coder may be substituted. Preferably, the video coder 1404 has a multiresolution capability. The spatial resolutions in one or more directions may be specified, and the temporal resolution may also be specified. Information about the specified spatial resolutions and temporal resolution is referred to as multiresolution video representation information. Multiresolution video representation information may be provided by control information received from the video source, or by control information received over the channel 1406 from the video decoder 1408.

The video coder 1404 encodes the video data and transmits the encoded data over the channel 1406. The channel 1406 may be a wire line channel, wireless channel, or any combination of these. Any suitable data communication format may be used to reliably communicate the encoded data. Moreover, the video coder 1404 communicates multiresolution video representation information over the channel 1406 to the video decoder 1408.

The video decoder 1408 receives the encoded video data from the channel and decodes the data to produce recovered video data. If multiresolution video coding is available, the video coder receives multiresolution video representation information from the channel and uses this information to select the proper spatial and temporal resolution for decoding the video data.

The components of the video data communication system 1400 may be embodied in any convenient manner, including software, hardware and combinations of these. The functionality described herein may be established using one or more computer readable program codes stored on computer readable data storage media or accessible over a wireline or wireless network as electrical signals. The computer readable program codes may be used to program a data processing device to perform the described functions in conjunction with other available devices. As will be appreciated by those ordinarily skilled in the art, functionality may be readily partitioned among hardware and software based on particular design requirements, each respective partition being equivalent to other functionally equivalents partitions.

2 Multiresolution Representation with Discrete Wavelet Transform

2.1 Wavelet Basis and Multiresolution Representation

A wavelet is a small wave having its energy concentrated in time and frequency, thus giving a very good tool for analysis of transient, non-stationary, or time-varying phenomena. With a mother wavelet function $\psi(t)$ and a corresponding scaling function $\phi(t)$, a multiscale wavelet basis can be formed by the functions $$\psi_{j,k}(t)=2^{j/2}\psi(2^j t-k), \qquad (1)$$

$$\phi_{j,k}(t)=2^{j/2}\phi(2^j t-k), \qquad (2)$$

The functions of equations (1) (2) are translations and dilations of the wavelet function $\psi(t)$ and the scaling function $\phi(t)$, where j represents the scale and k represents the shift. A signal s(t) thus can be linearly represented in terms of the basis as follows $$s(t) = \sum_{k} c_{j_o,k}\varphi_{j_o,k}(t) + \sum_{k}\sum_{j=j_o}^{+\infty} d_{j,k}\psi_{j,k}(t), \qquad (3)$$

where scaling coefficients $c_{j_o,k}$ and wavelet coefficients $d_{j,k}$ provide a multiresolution representation of the signal s(t). In the case where the wavelet basis is orthonormal, $c_{j_o,k}$ and $d_{j,k}$ can be represented as inner products of the signal and the basis $$c_{j_o,k}=<s(t),\phi_{j_o,k}(t)>, \; d_{j,k}=<s(t), \psi_{j,k}(t) \qquad (4)$$

The coefficients $c_{j_o,k}$ and $d_{j,k}$ are called the discrete wavelet transform (DWT) of the signal s(t). Note that a multi-resolution representation of signal s(t) is given by the signal expansion of equation (3), where the first term is a coarse approximation of s(t) and the second term gives multiresolution details of the signal.

A multiresolution representation similar to equation (3) can be generated for multi-dimensional signals such as digital images and digital videos, and the coefficients of the linear representation define a multi-dimensional discrete wavelet transform. The linear representation is based on a separable wavelet basis which is constructed based on a one-dimensional (1D) wavelet basis. For example, a two-dimensional (2D) wavelet basis for the linear representation may be formed by the following 2D functions $$\phi_{j_o,k_1}(t_1)\phi_{j_o,k_2}(t_2), \; \phi_{j,k_1}(t_1)\psi_{j,k_2}(t_2), \; \psi_{j,k_1}(t_1)\phi_{j,k_1}(t_2), \\ \psi_{j,k_1}(t_1)\psi_{j,k_2}(t_2), \qquad (5)$$

where $j_0$ is some integer; integer j ranges from $j_0$ to $+\infty$; and integers $k_1$, $k_2$ range from $-\infty$ to $+\infty$.

Notice that every element of 2D separable wavelet basis (5) is made of two elements of a 1D wavelet basis, and it is important to point out that the two elements of the 1D wavelet basis have the identical dilation scale j, since the two dimensions of a digital image are tied together and only the frequency information at the same scale along directions $t_1$ and $t_2$ is useful.

2.2 Filter Bank Implementation

The discrete wavelet transform is usually implemented with a multi-stage analysis filter bank. Previous work has showed the relation of wavelet coefficient calculation and filter banks.

Figure 1:
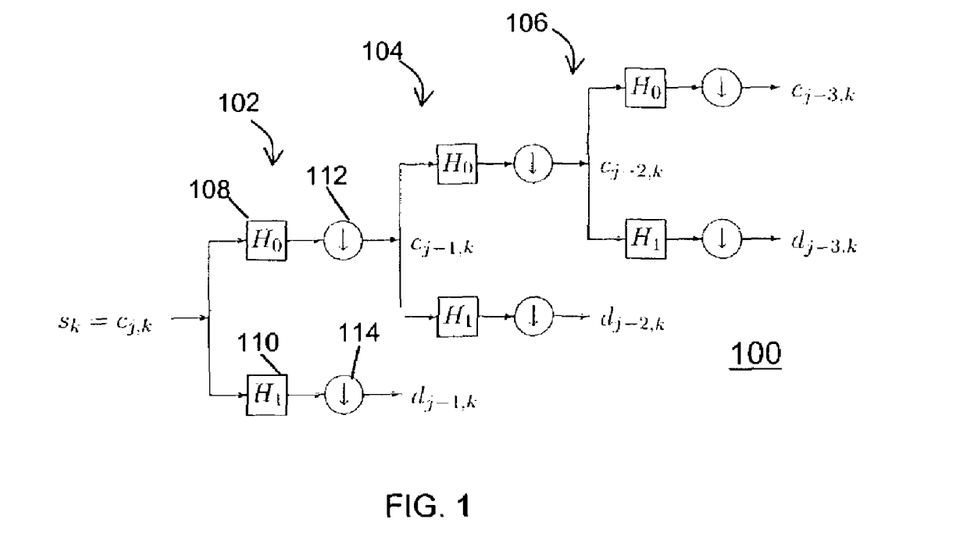
FIG. 1 illustrates a filter bank implementation of a three-level discrete wavelet transform.

Referring to the drawing, FIG. 1 is an illustration of a filter bank implementation of the three-level discrete wavelet transform. The filter bank 100 includes a first stage 102, a second stage 104 and a third stage 106. Each filter stage includes scaling filter $H_0$ 108 and associated decimator 112, and a wavelet filter $H_1$ 110 and associated decimator 114.

In the example below, a one-dimensional discrete signal $s=(s_k)$ is first used to illustrate the filter bank implementation of its three level discrete wavelet transform. For convenience, denote $c_{j,k}=s_k$, and a continuous signal $s(t)$ is constructed by $$s(t) = \sum_k d_{j-l,k} \varphi_{j,k}(t)$$

for some scale $j=j_0$. Then a three-level wavelet decomposition of $s(t)$ is given by $$\begin{aligned}
s(t) &= \sum_k c_{j,k} \varphi_{j,k}(t) \\
&= \underbrace{\sum_k c_{j-1,k} \varphi_{j-1,k}(t) + \sum_k d_{j-l,k} \psi_{j-l,k}(t)}_{\text{First level decomposition}} \\
&= \underbrace{\sum_k c_{j-2,k} \varphi_{j-2,k}(t) + \sum_k d_{j-2,k} \psi_{j-2,k}(t) +}_{\text{Second level decomposition}} \\
&\quad \sum_k d_{j-l,k} \psi_{j-l,k}(t) \\
&= \underbrace{\sum_k c_{j-3,k} \varphi_{j-3,k}(t) + \sum_k d_{j-3,k} \psi_{j-3,k}(t) +}_{\text{Third level decomposition}} \\
&\quad \sum_k d_{j-2,k} \psi_{j-2,k}(t) + \sum_k d_{j-l,k} \psi_{j-l,k}(t),
\end{aligned}$$

where the coefficients $c_{j-1,k}$, $c_{j-2,k}$, $c_{j-3,k}$, and $d_{j-1,k}$, $d_{j-2,k}$, $d_{j-3,k}$, obtained by filtering in the filter bank 100 of FIG. 1. The three-level wavelet decomposition of $s(t)$ provides a multiresolution representation of the discrete signal s. The three-level wavelet decomposition corresponds to the three-stage analysis filter bank, where the scaling filter $H_0$ and the wavelet filter $H_1$ are determined by the wavelet system $\{\varphi_{j,k}(t), \psi_{j,k}(t)\}$. The down-point arrows of the decimators 112, 114 denote an operation of decimation or down-sampling by two.

Note that a multi-stage analysis filter bank such as the filter bank 100 provides an efficient implementation of the discrete wavelet transform. The filters $H_0$ and $H_1$ are respectively a low-pass filter and a high-pass filter. Therefore, at each stage 102, 104, 106 of the filter bank 100, the spectrum of the input is divided into a low-frequency subband and a high-frequency subband. In a Haar wavelet system, the impulse responses $h_0$ and $h_1$ of the two filters $H_0$ and $H_1$ are $$h_0[1, 1]/\sqrt{2}, h_1 = [-1, 1]/\sqrt{2}. \tag{6}$$

Figure 2:
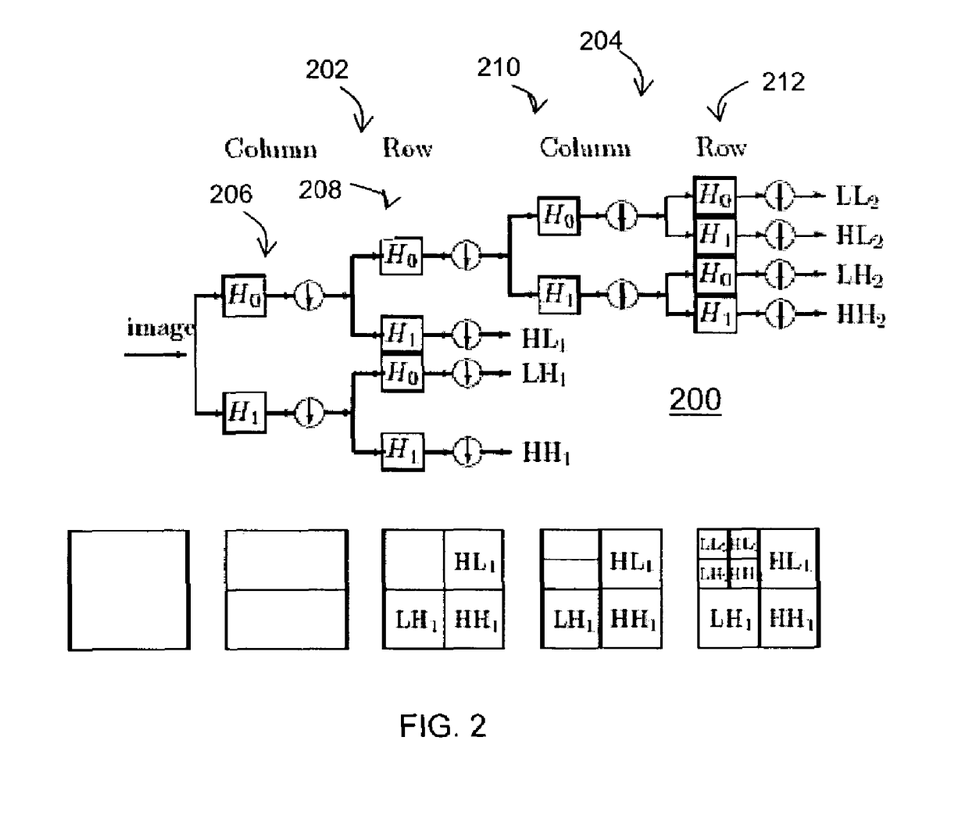
FIG. 2 illustrates a filter bank implementation of a two-level, two-dimensional discrete wavelet transform.

FIG. 2 illustrates a filter bank implementation of a two-level, two-dimensional discrete wavelet transform. Similar to the 1D case, a multi-dimensional discrete wavelet transform can also be implemented with a multi-stage filter bank 200. FIG. 2 illustrates a two-stage filter bank 200 which implements a two-level wavelet transform of an image. The filter bank 200 includes a first stage 202 and a second stage 204. The first stage 202 involves a column stage 206 and a row stage 208. Similarly, the second stage 204 involves a column stage 210 and a row stage 212. Each stage involves a low pass filtering in scaling filter $H_o$ and high pass filtering in wavelet filter $H_1$, with associated decimation.

Also illustrated at the bottom of FIG. 2 is the corresponding division of the 2D spectrum in the process of the filter bank iteration. Note that the implementation is a multi-stage iteration, involving lowpass filtering and highpass filtering along the column direction and the row direction of the image at each stage.

Figure 3:
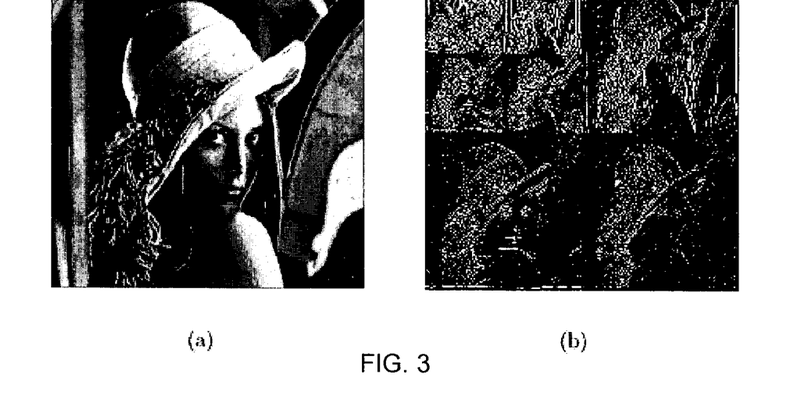
FIG. 3 shows a multiresolution representation of a Lena image generated with a two-dimensional discrete wavelet transform.

FIG. 3 shows an exemplary multiresolution representation of a Lena image generated with 2D discrete wavelet transform. FIG. 3(*a*) shows the original Lena image. FIG. 3(*b*) shows the multiresolution representation of the Lena image of FIG. 3(*a*) achieved with a 2D discrete wavelet transform of level 4.

Figure 4:
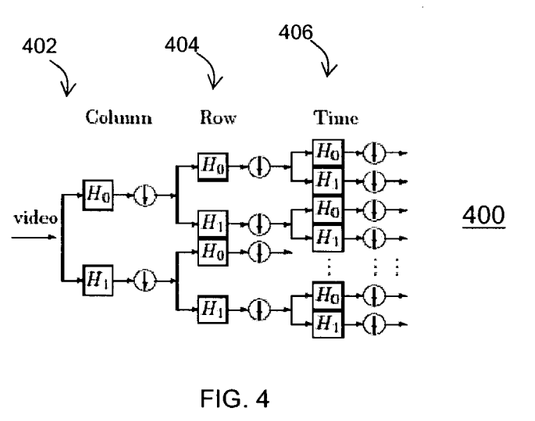
FIG. 4 shows a one-stage filter bank implementation of a one-level, three dimensional discrete wavelet transform

A three dimensional (3D) discrete wavelet transform for video signals can also be implemented with a multi-stage filter bank, similar to the 1D case illustrated in FIG. 1 and the 2D case illustrated in FIG. 2. At each stage of iterations, the filter bank divides in half the spectrum of the lowest frequency subband. FIG. 4 shows a one-stage filter bank implementation of a one-level, 3D discrete wavelet transform, where filtering along two spatial directions and temporal direction are applied sequentially at each stage. Thus, the single stage filter bank 400 includes a column stage 402, a row stage 404 and a time stage 406. Each stage involves a low pass filtering in scaling filter $H_o$ and high pass filtering in wavelet filter $H_1$, with associated decimation.

2.3 Image/Video Coding

Discrete wavelet transforms generate a multiresolution representation for images and videos, while significantly reducing the redundancy of the signals. There have been many wavelet image coders that achieve significant coding efficiency by exploiting the residual intra-band/inter-band redundancy. Spatial scalability in a wavelet image coder can be provided by the multiresolution generated by a wavelet transform, and fine granularity scalability can also be achieved by incorporating bit-plane coding techniques.

There have been also video coders that use a 3D discrete wavelet transform and achieve reasonable coding efficiency. However, for exploitation of temporal redundancy in video sequences, motion compensation seems more effective than temporal wavelet transform, since the temporal redundancy exists among pixels along the motion directions, not among co-located pixels. In addition, since the decomposition of video signals using a 3D discrete wavelet transform does not provide separate temporal frequency information and spatial frequency information, it is not flexible to reconstruct a video sequence of non-uniformly reduced frame rate and image size. In other words, video coders using a 3D discrete wavelet transform cannot support an arbitrary combination of spatial scalability and temporal scalability.

3 Multiresolution Video Representation with Motion Compensated Temporal Filtering

3.1 Modified Multiscale Wavelet Basis for Video Signals

3.1.1 Separable Wavelet Basis with Hybrid Scale

Every element of a 2D separable wavelet basis, such as equation (5), is made of two elements of a 1D wavelet basis, and the two elements of the 1D wavelet basis have the identical dilation scale j. If a 2D wavelet basis allows different dilation scales for the two components that generate an element of the 2D basis, then the coefficients of a signal $s(t_1,t_2)$ linearly represented in terms of the 2D wavelet basis can be obtained by sequentially applying to $s(t_1,t_2)$ a 1D discrete wavelet transform along direction $t_1$ ($t_2$) and a 1D discrete wavelet transform along direction $t_2$ ($t_1$). These coefficients may also define a hybrid scale 2D wavelet transform, different from the usual 2D discrete wavelet transform.

Figure 5:
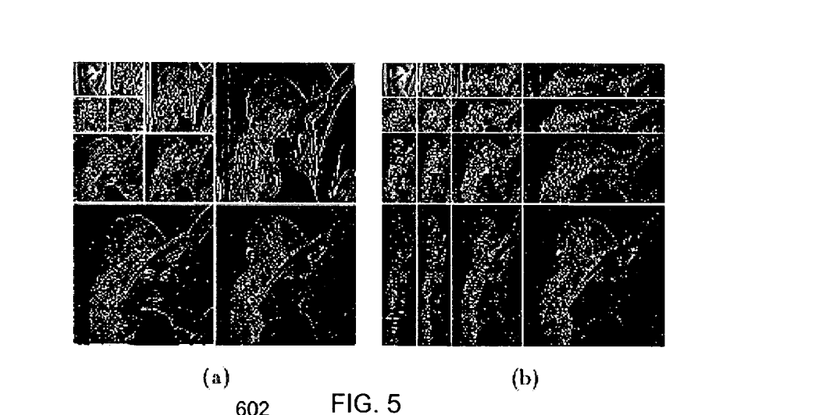
FIG. 5 illustrates the frequency division resulting from two types of transform.

To show the difference, FIG. 5 illustrates with the Lena image the frequency division resulting from the two types of transform. FIG. 5(*a*) shows frequency division of a two-dimensional discrete wavelet transform of level three. FIG. 5(*b*) shows a hybrid scale two-dimensional wavelet transform of level three.

It does not appear attractive to represent an image based on a wavelet basis with hybrid scales, since it generally does not make sense to consider the horizontal frequency and the vertical frequency separately. However, since the temporal frequency information and the spatial frequency information are not tightly tied together in video signals, it is beneficial to separately present the two types of frequency information in a multiresolution representation of video signals. Therefore, an element of a separable multiscale wavelet basis for video signals may have different scales for temporal direction and spatial directions. Therefore, a multiresolution representation of video signals may be obtained by separating the 2D discrete wavelet transform along the spatial direction and the 1D discrete wavelet transform along the temporal direction. In other words, the decomposition of video signals along the temporal direction is not intertwined with the decomposition along the spatial direction. There are two such implementations which are equivalent. The first implementation is pixel-domain temporal filtering. The second implementation is wavelet-domain temporal filtering. The pixel-domain temporal filtering involves a 1D discrete wavelet transform along the temporal direction followed by a 2D wavelet transform for each frame. The wavelet-domain temporal filtering involves a 2D discrete wavelet transform for each frame followed by a 1D discrete wavelet transform along the temporal direction.

3.1.2 Separable Wavelet Basis with Hybrid Component

A separable wavelet basis of higher dimensions is based on one single 1D wavelet basis. The basis of equation (5), above, is an example. In other words, the components of every element of the basis come from the same 1D wavelet basis. However, a similar separable wavelet basis may be formed based on multiple 1D wavelet bases; each element of the basis being constructed with components from these 1D bases. For example, a 2D wavelet basis may be formed, in terms of two wavelet systems $\{\phi^1_{j,k}, \psi^1_{j,k}\}$ and $\{\phi^2_{j,k}, \psi^2_{j,k}\}$, by the following 2D functions $$\phi^1_{j_0,k_1}(t_1)\phi^2_{j_0,k_2}(t_2), \quad \phi^1_{j,k_1}(t_1)\psi^2_{j,k_2}(t_2), \quad \psi^1_{j,k_1}(t_1)\phi^2_{j,k_2}(t_2), \psi^1_{j,k_1}(t_1)\psi^2_{j,k_2}(t_2)$$

where $j_0$ is some integer and integer j ranges from $j_0$ to $+\infty$; and integers $k_1$, $k_2$ range from $-\infty$ to $+\infty$. Consequently, different wavelets are applied to multi-dimensional signals along different directions. In general, there is no need to use two 1D wavelet bases to construct a separable wavelet basis for digital images, since there is no necessity to use different wavelets to differentiate frequency information along horizontal direction and along vertical direction. However, that is not the case for digital video signals due to concerns of complexity and delay. It is preferable to have simpler wavelet transforms applied to the video signals along the temporal direction than that applied along the spatial directions. For this reason, the Haar wavelet transform of equation (6) above is usually employed to exploit the temporal redundancy in video coding due to the tradeoff of its decorrelation efficiency and its computational complexity. Note that at each stage of the filter bank implementation, the filtering involves only two frames since both the scaling filter and the wavelet filter in the Haar wavelet system have two taps.

Figure 6:
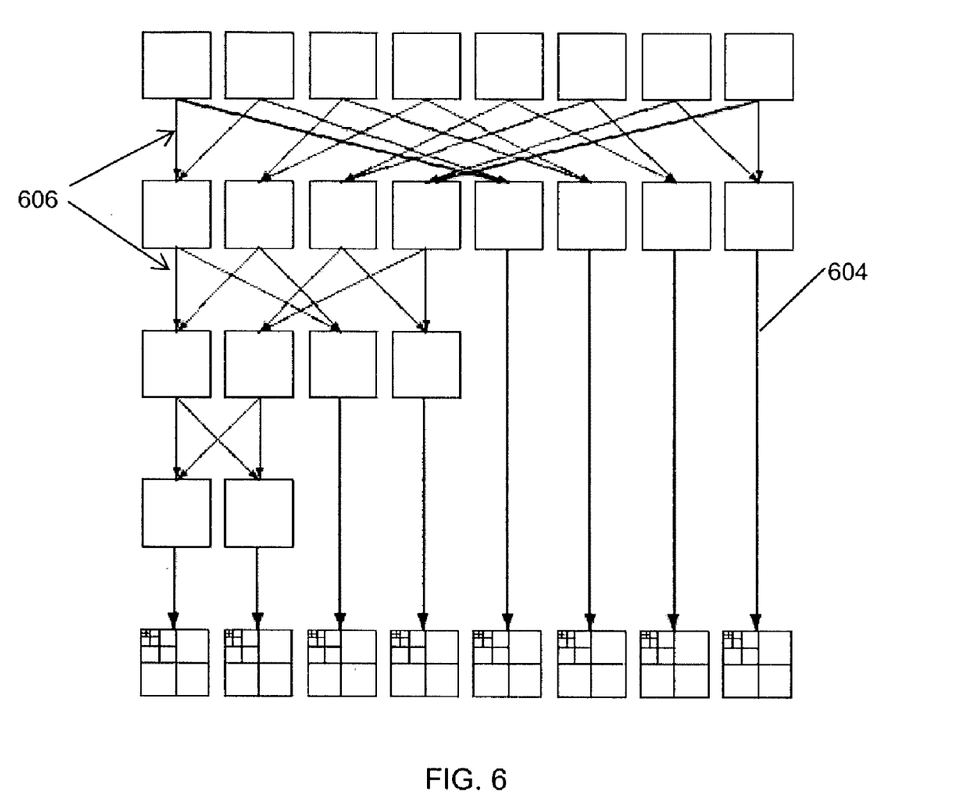
FIG. 6 illustrates a pixel-domain temporal filtering with a Haar wavelet transform video representation process.

FIG. 6 is an example of pixel-domain temporal filtering with a Haar wavelet transform. In FIG. 6, square blocks 602 represent consecutive frames. Thick vertical arrows 604 represent a spatial wavelet transform. Other thin arrows 606 represent filter bank iteration of a Haar wavelet.

FIG. 6 is an illustration of a 3D hybrid scale wavelet transform with a Haar wavelet transformation for the temporal direction. In this example, a Haar wavelet transform of three levels is first applied along the temporal direction followed by a spatial wavelet transform of four levels. In the temporal filtering process, frames in a Group Of Frames (GOF) are grouped into pairs and co-located pixels in the pair of frames are temporally filtered. Hence, two consecutive frames are filtered as a pair to create one low frequency frame or average frame and one high frequency frame or difference frame. These resulting low frequency frames may be decomposed further for a temporally coarser representation, leading to a pyramidal decomposition structure.

3.2 Motion Compensated Temporal Filtering (MCTF)

Since interframe redundancy exists between pixels along motion directions, it is desirable to apply the Haar wavelet transform to pixels along the motion trajectory rather than pixels co-located in two consecutive frames. Therefore, motion should be compensated when the Haar wavelet transform is applied to two consecutive frames. Consequently, the corresponding filtering using Haar wavelet transform is called motion compensated temporal filtering or MCTF.

Figure 7:
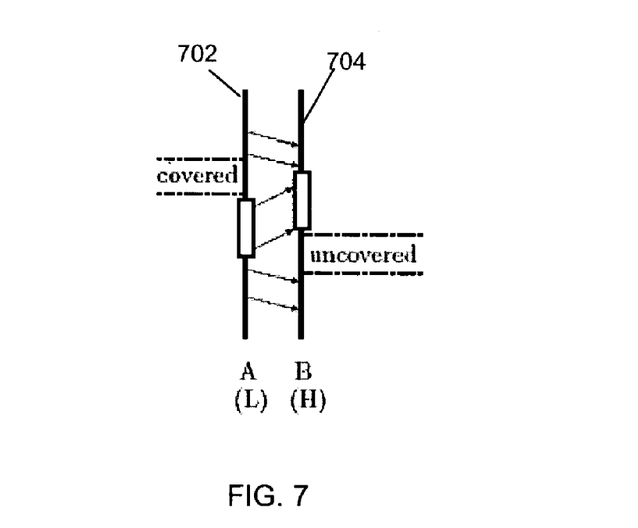
FIG. 7 illustrates one-level motion compensated temporal filtering.

To clearly understand MCTF, it is important to have a detailed analysis of a one-level filtering of two frames. FIG. 7 shows one-level motion compensated temporal filtering. FIG. 7 shows that two frames, labelled Frame A 702 and Frame B 704, are filtered with motion compensation as a pair to create one Low frequency frame (L frame) and one High frequency frame (H frame). Therefore, the process of encoding frames A and B is replaced by a process of encoding the resulting L frame and H frame.

The filtering operation is essentially a pixel-wise operation. Suppose A(m,n) and B(s,t) are two pixels in Frame A 702 and Frame B 704 to which Haar filtering is applied. Then, one-level MCTF of A(m,n) and B(s,t) can be implemented as follows:

$$H(s, t) = (B(s, t) - A(m, n))/\sqrt{2}, \quad (7)$$

-continued $$L(m, n) = (A(m, n) + B(s, t))/\sqrt{2}. \quad (8)$$

This parallel implementation is equivalent to a sequential implementation, called a lifting implementation, given as follows:

$$H(s, t) = (B(s, t) - A(m, n))/\sqrt{2}, \quad (9)$$

$$L(m, n) = H(s, t) + \sqrt{2} A(m, n). \quad (10)$$

It remains how to determine the correspondence between pixels A(m,n) and B(s,t). Since pixels along the motion direction have the strongest correlation, any algorithm that establishes the correspondence between pixels in two frames has to involve motion estimation. Two pixels that are located along a motion vector are called connected. Unconnected pixels in Frame A 702 are usually occluded and are called covered. Similarly, unconnected pixels in Frame B 704 are called uncovered and usually appear in the coming or subsequent frame. Special attention should be paid to covered/ uncovered pixels in MCTF.

3.3 Video Coding

The multiresolution representation of video signals generated by pixel-domain MCTF and spatial wavelet transform, as shown in FIG. 6, provides an efficient representation of video signals, and it has been adopted in wavelet based video coding. MC-EZBC is a wavelet coder that exploits temporal correlation with MCTF. MC-EZBC is described in the following publication: S. -T. Hsiang and J. W. Woods, "Embedded video coding using invertible motion compensated 3-d subband/wavelet filter bank," *Signal Processing: Image Communication*, vol. 16, May 2001. MC-EZBC uses an MCTF with an EZBC spatial coder. The EZBC spatial coder is described in the following publication: S. -T. Hsiang and J. W. Woods, "Embedded image coding using zeroblocks of subband/wavelet coefficients and context modeling," in *ISCAS*-2000, http://www.cipr.rpi.edu/publications/publications.html, May 2000. MC-EZBC is based on a multiresolution video representation which is generated by MCTF followed by spatial wavelet transform. Since the motion vectors for MCTF are obtained for frames of full resolution, motion vectors corresponding to reduced resolution have to be derived from the available full-resolution motion vectors. In other words, motion vectors are not spatially scalable, thus spatial scalability is not well supported by the MC-EZBC video coder. The effectiveness of MCTF in exploiting temporal redundancy in video coding has also been shown by fully scalable zerotree (FSZ) coder.

The MC-EZBC coder is a coder that is fully embedded in quality/bit-rate, and is capable of supporting scalability in spatial resolution and frame rate. The fine granular quality scalability is achieved due to the bitplane coding of EZBC and the inherent pyramidal decomposition in the spatial domain. In addition, MC-EZBC can easily achieve constant quality in frame level and in GOF level, by stopping the bitplane coding at the same bitplane for each frame. Since MCTF generates a pyramidal decomposition of a GOF along the temporal direction, sequences in ½, ¼ or ⅛ frame rate could be easily reconstructed, and the reconstructed frame rate can be determined in the transmission time or in the decoding time. Therefore, temporal scalability is flexibly supported by the MC-EZBC coder. The multiresolution representation in the spatial domain naturally provides flexibility in reconstructing video sequences of reduced sizes. However, the motion compensation in MCTF complicates the problem of spatial scalability in the MC-EZBC coder, since subband-level motion vectors required for size-reduced video reconstruction in MCTF are not available. Recall that motion vectors are available only for frames of full resolution. Thus, motion vectors for lower resolutions have to be derived from the motion vectors for the full resolution by scaling, for example. This clearly leads to a drifting problem. Due to the independence between temporal decomposition and spatial decomposition, the combination of these two types of scalability is trivial. However, the combination of quality scalability with either one of these two types of scalability will have a quality degradation problem.

4 Multiresolution Video Representation with Scalable Motion Vectors 4.1 Wavelet-Domain MCTF With the introduction of hybrid scales to the separable wavelet basis for video signals, a multiresolution representation in terms of the wavelet basis can be obtained by either pixel-domain temporal filtering or wavelet domain temporal filtering. These two implementations are equivalent since the operation of temporal filtering of co-existing pixels in two frames is commutable with the spatial wavelet transform. However, the introduction of motion compensation into the temporal filtering alters this, since motions in video signals are generally nonlinear. Consequently, the multiresolution representation generated by pixel-domain MCTF is not equivalent to that generated by wavelet-domain MCTF.

Figure 8:
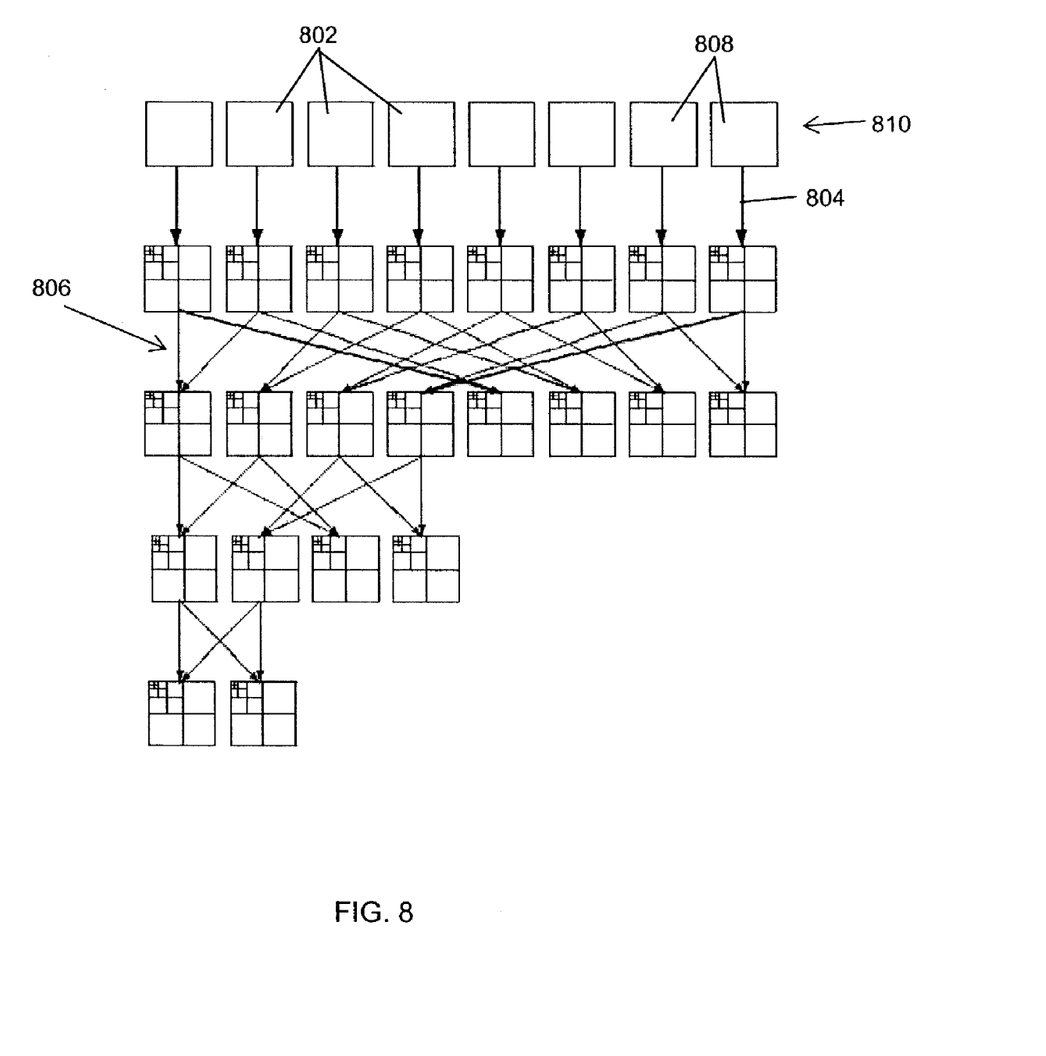
FIG. 8 illustrates a wavelet-domain motion compensated temporal filtering video representation process.

The process of generating a multiresolution representation of video signals via pixel-domain MCTF has been discussed above in Section 3 and is shown in FIG. 6. FIG. 8 illustrates a wavelet-domain MCTF process, where symbols and relationships among the symbols are similar those used in FIG. 6. That is, in FIG. 8, square blocks 802 represent consecutive frames; thick vertical arrows 804 represent spatial wavelet transform; and other thin arrows 806 represent the Haar wavelet based motion compensated temporal filtering process. It is shown in the figure that each of the eight frames 808 in a GOF 810 is first decomposed with a four-level wavelet transform. Then, three-level MCTF iterations are performed to each spatial subband of the eight frames in the wavelet domain to generate a multiresolution representation of the GOF 810 along the temporal direction. In each subband MCTF, wavelet coefficients of the subband are temporal filtered along the motion directions to generate low temporal frequency frames and high temporal frequency frames.

In terms of implementation, the difference between processes of generating multiresolution video representation via pixel-domain MCTF and wavelet-domain MCTF is the order of the MCTF and spatial wavelet transform. Another way to see this difference is that subband MCTF is performed in the wavelet-domain MCTF process but not in the other. The advantage of subband MCTF is that spatially scaled motion vectors corresponding to reduced resolutions are obtained during the process of wavelet-domain MCTF.

Due to the independence of the temporal wavelet decomposition and the spatial wavelet decomposition in generating a multiresolution representation for video signals, single-level temporal filtering and single-level spatial filtering can be arbitrarily intertwined. The processes of generating a multiresolution representation of video signals via pixel-domain MCTF, as embodied in FIG. 6 and via wavelet-domain MCTF as embodied in FIG. 8 are two exceptions, since there is no intertwining of spatial filtering and temporal filtering in these two processes. However, for a given maximal level of temporal wavelet decomposition and a given maximal level of spatial wavelet decomposition, there are many processes to intertwine temporal filtering and spatial filtering differently. Since the temporal filtering involves motion compensation, the different processes of intertwining MCTF and spatial filtering result in different multiresolution representations, each of which may be used in video coding.

Figure 9:
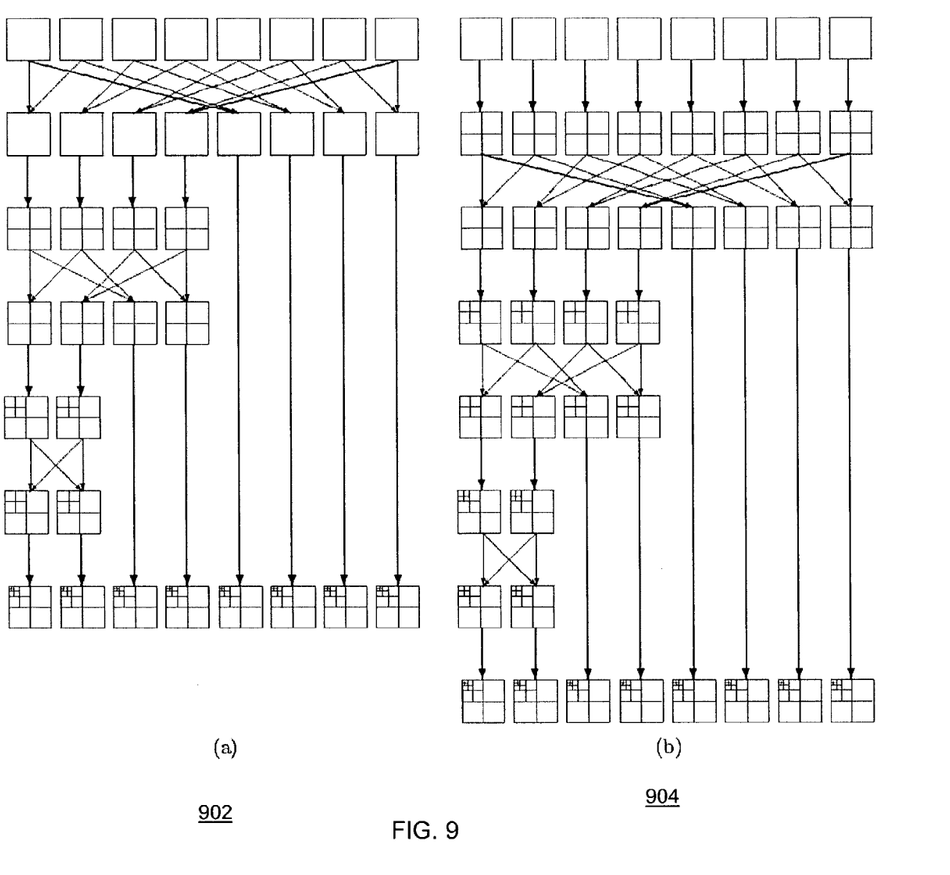
FIG. 9 illustrates two exemplary video representation processes which have alternative single-level spatial wavelet filtering and single-level temporal wavelet filtering.

FIG. 9 shows two typical filtering processes which have alternative single-level spatial wavelet filtering and single-level temporal wavelet filtering. In FIG. 9(a) on the left side of FIG. 9, a first filtering process 902 starts with MCTF at the first level of iteration. In FIG. 9(b), on the right side of FIG. 9, a second filtering process 904 starts with spatial wavelet filtering at the first level. Both filtering processes 902, 904 generate a multiresolution representation having a temporal level of three and spatial level of four.

4.2 Spatially Scalable Motion Vectors

Since subband-level motion vectors required for size-reduced video reconstruction are not available when the pixel-domain MCTF is used to generate the multiresolution representation, motion vectors for lower spatial resolutions have to be derived from the motion vectors for the full spatial resolution by scaling. It is thus desired to have explicit and accurate subband-level motion vectors in a wavelet video coder for the support of spatial scalability. The availability of subband-level motion vectors implies the spatial scalability of motion vectors.

Subband MCTF filtering processes are advantageous over the pixel-domain MCTF process, since subband motion vectors are obtained when performing MCTF subband by subband. In other words, subband MCTF provides spatially scalable motion vectors. A typical example is the wavelet-domain MCTF process shown in FIG. 8. In that example, motion vectors are available for subband of substantially any spatial resolution that the temporal wavelet decomposition generates. Therefore, spatial scalability of motion vectors is fully supported by wavelet-domain MCTF but not supported by time-domain MCTF at all. Here, full support means that there exist corresponding motion vectors for reconstruction of video sequences of any possible combined spatial resolution and temporal resolution, constrained by the maximal spatial decomposition level and the maximal temporal decomposition level. For a specific example of video sequence of eight frames, shown for example in FIG. 6, FIG. 8 and FIG. 9, the maximal spatial wavelet decomposition level is four and the maximal temporal decomposition level is three. In other examples, different decomposition levels may be applied. Thus, spatial resolution of video sequences that are possibly reconstructed from multiresolution representations are ½, ¼, ⅛ or 1/16 of the original spatial resolution. Similarly, video sequences of ½, ¼ or ⅛ of the original temporal resolution (frame rate) may be reconstructed.

The spatial scalability of motion vectors is fully supported by the wavelet-domain MCTF process, since scalable motion vectors corresponding to all possible subbands are available when the first-level MCTF is applied to the frames which have been spatially decomposed to the maximal spatial decomposition level. If the first-level MCTF is applied to a spatial decomposition of some intermediate level, motion vectors corresponding to lower spatial resolutions are not available. Therefore, the size of the lowest spatial subband is the lowest resolution that can be reconstructed with available scalable motion vectors. A similar situation happens for other MCTF iterations. This indicates a close relationship between spatial decomposition and temporal decomposition with respect to the reconstruction of spatially scaled and temporally scaled video sequences. For example, motion vectors corresponding to half spatial resolution are obtained in the second-level MCTF in the process shown in FIG. 9(a), while similar motion vectors are obtained in the first-level MCTF in the process shown in FIG. 9(b). The direct influence of this difference is whether spatially scalable motion vectors are available for the support of combined spatial scalability and temporal scalability. Clearly, a video sequence of half spatial resolution and full temporal resolution can be reconstructed via the process of FIG. 9(b), but cannot be reconstructed via the process of FIG. 9(a), or can only be reconstructed with quality degradation due to derived motion vectors. Actually, with the process illustrated in FIG. 9(a), the maximal temporal resolution of video sequences of half spatial resolution is half of the full temporal resolution.

The above discussion shows that the spatial scalability of motion vectors supported by a multiresolution video representation process is closely related to the support of reconstruction of spatially scaled and temporally scaled video sequences, i.e., combined spatial scalability and temporal scalability. Actually, such a video representation process can be characterized by the availability of spatially scalable motion vectors for the support of combined spatial scalability and temporal scalability.

A two-dimensional function is defined for this purpose. For a given video representation process $\Lambda$, we can denote by $\alpha_\Lambda(s,t)$ the availability of spatially scalable motion vectors for the support of combined spatial scalability and temporal scalability. Here, the spatial resolution parameter s and the temporal resolution parameter t represent the resolution level of the corresponding spatial scalability and temporal scalability, respectively taking values 1, ½, ¼, . . . , or $1=2^{L_s}$ and 1, ½, ¼, . . . , or $½^{L_t}$. Here $L_s$ and $L_t$ represent the maximal spatial decomposition level and the maximal temporal decomposition level, respectively.

The function $\alpha_\Lambda(s,t)$ takes value of either one or zero, respectively indicating whether or not there exist motion vectors in the representation process corresponding to the spatial decomposition level parameterized by s and temporal decomposition level parameterized by t. Essentially, $\alpha_\Lambda(s,t)$ indicates whether or not the corresponding combined scalability is supported by the representation process. When motion vectors are not needed for a reconstruction corresponding to a resolution parameter pair (s,t), $\alpha_\Lambda(s,t)$ is also set to 1. Since variables s and t both takes discrete values, the function $\alpha_\Lambda(s,t)$ may be tabulated, and a table characterizes the representation process in terms of the combined temporal scalability and spatial scalability it supports. The table is called spatial-temporal scalability table, or in short, ST-table.

Figure 10:
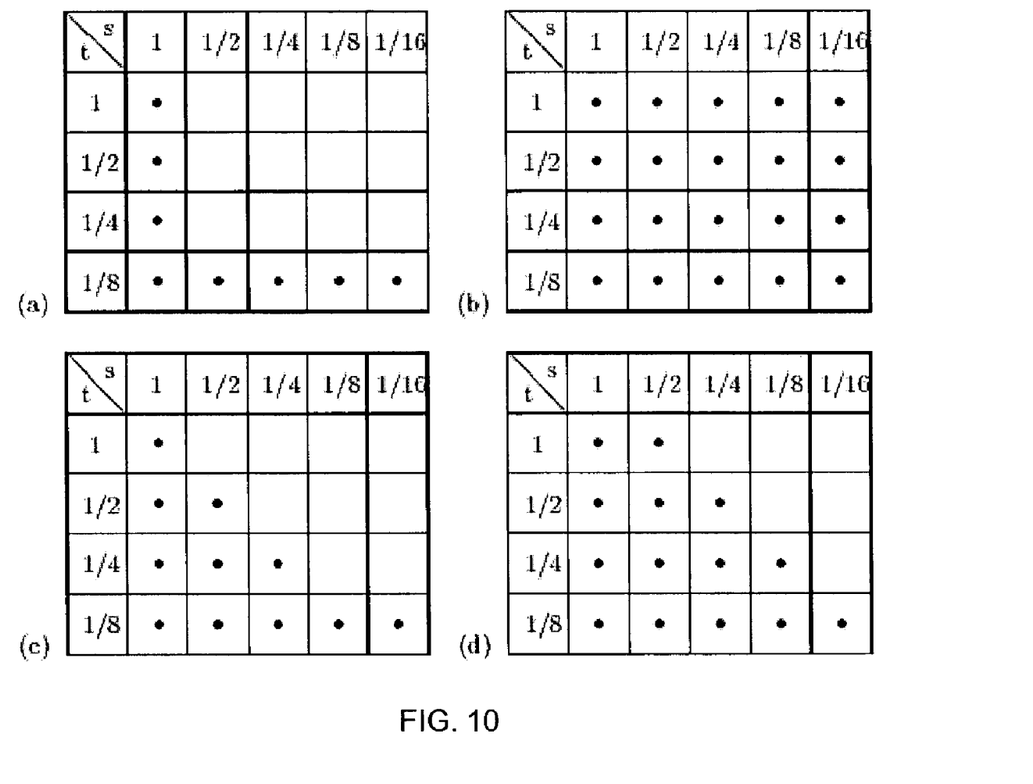
FIG. 10 illustrates exemplary spatial-temporal scalability tables which respectively correspond to the time-domain MCTF process shown in FIG. 6, the wavelet-domain MCTF process shown in FIG. 8, and the two alternative temporal/spatial filtering processes shown in FIG. 9.

FIG. 10 shows four exemplary ST-tables. The ST-table of FIG. 10(a) corresponds to the time-domain MCTF process shown in FIG. 6. The ST-table of FIG. 10(b) corresponds to the wavelet-domain MCTF process shown in FIG. 8. The ST-tables of FIG. 10(c) and FIG. 10(d) correspond to the two alternative temporal/spatial filtering processes shown in FIG. 9. Note that in the example, $L_s$×4 and $L_t$=3; and that when $\alpha_\Lambda(s,t)$ takes the value 1, a bullet in the table. To explain how the tables are formed or how function values $\alpha_A(s,t)$ are determined, it is beneficial to consider the properties of the function, which are summarized as follows:

For any $s$ and $t$; either $\alpha_A(1,t)=1$ holds or $\alpha_A(s,t)=0$ holds. (11)

$\alpha_A(1,t)=1$ holds for any $t$. (12)

$\alpha_A(s, \frac{1}{2}^{L_t})=1$ holds for any $s$. (13)

If $\alpha_A(s,t)=1$; then $\alpha_A(s,t/2)=1$. (14)

If $\alpha_A(s,t)=0$; then $\alpha_A(s,2t)=0$. (15)

If $\alpha_A(s,t)=1$; then $\alpha_A(2s,t)=1$. (16)

If $\alpha_A(s,t)=0$; then $\alpha_A(s/2,t)=0$. (17)

According to the property of equation (16), if there is a bullet at the position (s,t) in an ST-table, i.e., $\alpha_A(s,t)=1$, then $\alpha_A(2s,t)=\alpha_A(4s,t)=\ldots \alpha_A(\frac{1}{2},t)=1$ holds, i.e., any position to the left of position (s,t) on the same row in the table also has a bullet. Therefore, it is critical to determine the position $s_i$ of rightmost bullet for each row i of the table. Each row of the table corresponds to a level of MCTF; from top to bottom, the first row corresponds to the first-level MCTF, the second row corresponds to the second-level MCTF, etc. Therefore, the rightmost position $s_i$ corresponds to the lowest spatial resolution in the spatially decomposed frame to which the i-th level MCTF is applied.

It is easy to observe from FIG. 6 and FIG. 9 that $s_1=s_2=s_3=1$ for the pixel-domain MCTF process and $s_1=s_2=s_3=\frac{1}{16}$ for the wavelet-domain MCTF process. This observation explains the table in FIG. 10(a) corresponding to the process of FIG. 6 and the table in FIG. 10(b) corresponding to the process of FIG. 8. Similarly, the corresponding parameter values for the two processes shown in FIG. 9(a) and FIG. 9(b) are respectively $s_1=1$, $s_2=\frac{1}{2}$, $s_3=\frac{1}{4}$ and $s_1=\frac{1}{2}$, $s_2=\frac{1}{4}$, $s_3=\frac{1}{8}$, which explains the remaining two tables in FIG. 10(c) and FIG. 10(d).

4.3 Design of a Video Representation Scheme

It has been seen that for a given maximal level of temporal wavelet decomposition and a given maximal level of spatial wavelet decomposition, there are many ways to intertwine single-level temporal filtering and spatial filtering, yielding many different multiresolution video representations which include spatially scalable motion vectors for the support of different combinations of spatial scalability and temporal scalability. Such diversity of multiresolution video representations offers flexibility of selecting a video representation scheme to fulfill the desired scalability requirements. Consequently, fundamental problems are how to design such a video representation scheme and how to signal the scheme in a video coder. This subsection is devoted to answering the first question and the second will be discussed in the following subsection.

Figure 11:
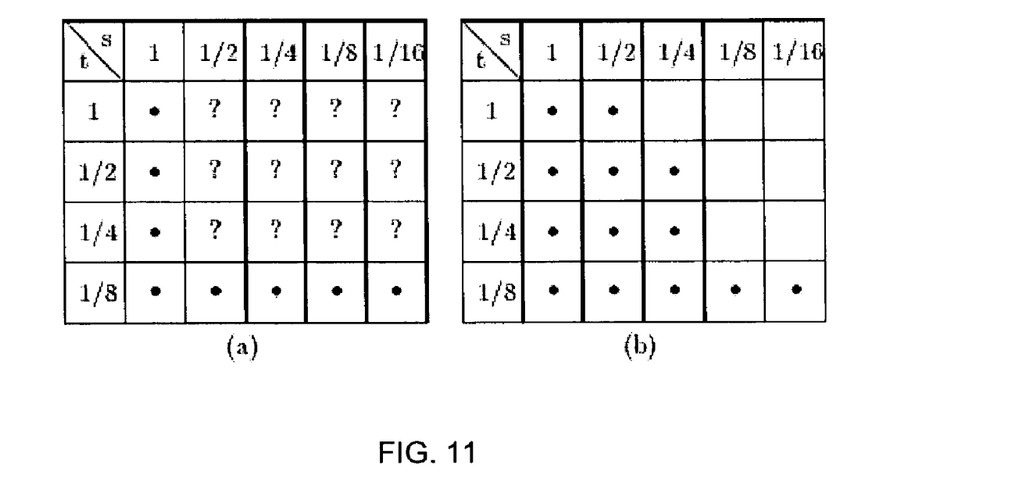
FIG. 11 is a table used in conjunction with an exemplary design of a video representation scheme.

The requirements on spatial scalability and temporal scalability imposed by a coder may be represented by an ST-table. Therefore, the design of a video representation scheme starts with designing an ST-table. Designing an ST-table involves determining entries of the ST-table at the positions marked by a question mark in the table of FIG. 11(a). As an ST-table is given, the design problem is equivalent to how to determine the intertwining pattern of spatial filtering and temporal filtering based on the given ST-table. One way to determine the intertwining pattern is to determine the spatial decomposition level of the frames when a level of MCTF is applied. These spatial decomposition levels are determined by spatial decomposition parameters $s_i$ which are defined as follows:

$$s_i := \min\{s:\alpha_A(s,\frac{1}{2}^{i-1})=1\} i=1,2,\ldots,L_t. \quad (18)$$

The spatial decomposition parameter $s_i$ indicates that when the i-th level MCTF is performed, the frames have been spatially decomposed and the resolution of the lowest subband is a fraction $s_i$ of the original spatial resolution of the frames. In other words, $-\log_2 s_i$ levels of spatial wavelet decomposition have been performed on the frames. The information provided by the parameters $s_i$ is sufficient to specify a video representation scheme.

Figure 12:
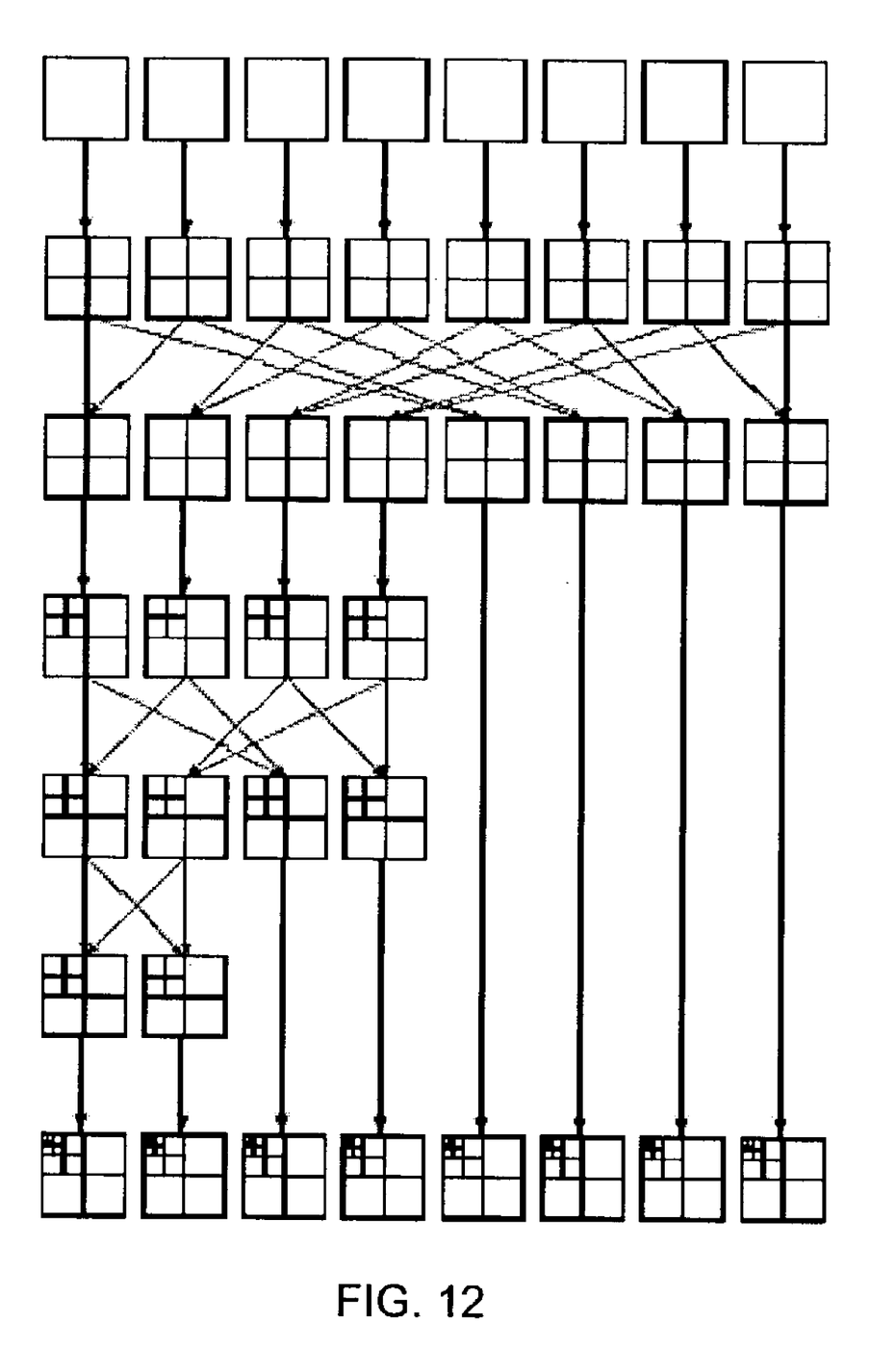
FIG. 12 a video representation scheme designed in accordance with the example of FIG. 11.

Below, an example is used to illustrate the design of a video representation scheme to accomplish the scalability requirements for coding 30 Hz 4CIF video sequences. It is generally desirable that the scalable video coder allows reconstruction of a 30 Hz CIF video sequence and a 15 Hz QCIF video sequence from the scalable video bitstream. These requirements on the scalability for the video coder can be equivalently represented in the ST-table shown in the table of FIG. 11(b). Clearly, $s_1=\frac{1}{2}$, $s_2=\frac{1}{4}$, $s_3=\frac{1}{4}$. Therefore, the first level MCTF is applied to spatially decomposed frames whose lowest subbands are of $s_1=\frac{1}{2}$ of the original spatial resolution, i.e., one level of spatial decomposition has been performed on the original frames. Similarly, when the second level MCTF and the third level MCTF are applied, two levels of spatial decomposition have been performed on the original frames. Therefore, there is a one-level spatial filtering right before the second level MCTF, and there is no spatial filtering between the second level MCTF and the third level MCTF. After the third level MCTF, one or more levels of spatial decomposition is performed so that all frames can be spatially decomposed up to the maximal level of four ($L_s=4$). According to the above analysis, the representation scheme may be determined as shown in FIG. 12.

Besides the above method to determine the intertwining pattern, there exists another way which is symmetric to the above method. That is, to determine the temporal decomposition level when a spatial filtering is applied, for each spatial wavelet decomposition level. Similarly, these temporal decomposition levels are determined by the temporal decomposition parameters which are defined as follows:

$$t_j := \max\{t:\alpha_A(\frac{1}{2}^j,t), j=1,2,\ldots,L_s\}. \quad (19)$$

The temporal decomposition parameter $t_j$ indicates that when the j-th level spatial filtering is performed, the frames have been temporally decomposed and the temporal resolution of the lowest subband is a fraction $t_j$ of the original temporal resolution of the frames. In other words, $-\log_2 t_j$ levels of temporal wavelet decomposition (MCTF) has been performed to the frames. In an analogous way of utilizing parameters $s_i$'s, the intertwining pattern of temporal filtering and spatial filtering is determined by using parameters $t_j$'s. For the ST-table shown in FIG. 11(b), $t_1=1$, $t_2=\frac{1}{2}$, $t_3=\frac{1}{8}$, $t_4=\frac{1}{8}$, and these parameters can be easily used to determine the video representation scheme shown in FIG. 12. The symbols using in the video representation scheme of FIG. 12 correspond to those described above in conjunction with FIGS. 6 and 8.

4.4 Encode a Video Representation Scheme

When a multiresolution video representation is used in video coding, it is necessary to signal the selected representation to the decoder. Since its ST-table characterizes the video representation scheme as described above in Section 4.3, encoding the selection of the video representation scheme only requires encoding its corresponding ST-table.

Since the spatial decomposition parameters $s_i$ defined in equation (18) based on the ST-table can uniquely determine the video representation scheme, only these parameters need to be transmitted. Let $r_i$ represent the number of bullets on the i-th row of the ST-table, i.e., $r_i=-\log_2 s_i+1$. Since the parameter $s_i$ is closely related to $r_i$, it is only necessary to code the parameters $r_i$, which are in an increasing order with i. For the examples shown herein, $r_1=r_2=r_3=1$ holds for the pixel-domain MCTF process and $r_1=r_2=r_3=5$ holds for the wavelet-domain MCTF process. For the two processes shown in FIG. 9(a) and FIG. 9(b), the parameters are respectively $r_1=1$, $r_2=2$, $r_3=3$ and $r_1=2$, $r_2=3$, $r_3=4$. For the exemplary video representation scheme designed in Section 4.3 and shown in FIG. 12, the parameters are $r_1=2$, $r_2=3$, $r_3=3$. Alternatively, since $r_1$ 1 for each i, it is only necessary to transmit the value $r_i-1$, which is in the range of 0 to $L_s$. Therefore, the parameters $r_i-1$ may be differentially coded, each coding unit being in the range of 0 and $L_s$.

Similarly, it is also only needed to transmit the temporal decomposition parameters $t_j$, defined above in equation (19), or $c_j$, the number of bullets on each column of the ST-table, or simply the parameters $c_j-1$ for each j. Note that $t_j$ and $c_j$ are linked by the relation $c_j=L_t+\log_2 t_j+1$. Also, the parameters $c_j$, in the range of 0 to $L_t$, are in a decreasing order with j and can be differentially coded similar to $r_j-1$.

According to the properties of equations (11-17), it is known that ST-tables illustrated by bullets inserted in the table for one values, as shown in FIG. 10, have a lower-triangular type of shape. Therefore, to code an ST-table, it is only necessary to code the upper-right boundary of the shape. This motivates a boundary-based method to code an ST-table. The code is thus called a shape code. The boundary between the bulleted table entries and the non-bulleted table entries has a generally staircase shape. Two symbols are thus needed to represent the moving trend of the boundary, 1 for the vertical direction and 0 for the horizontal direction, for example. Since the size of an ST-table is $(L_s+1)\times(L_t+1)$, $L_s$ bits are needed for the horizontal direction and $L_t$ bits are needed for the vertical direction. However, not all these bits are necessary, since once $L_s$ bits signaling the vertical direction are known, the spatial decomposition parameters $s_i$, as defined in equation (18), are determined and the representation process is uniquely determined. Similarly, once $L_t$ bits signaling the horizontal direction are known, the temporal decomposition parameters $t_j$ as defined in equation (19) are determined and no other bits are necessary. Therefore the maximal number of bits for a shape code is $L_s+L-1$.

Figure 13:
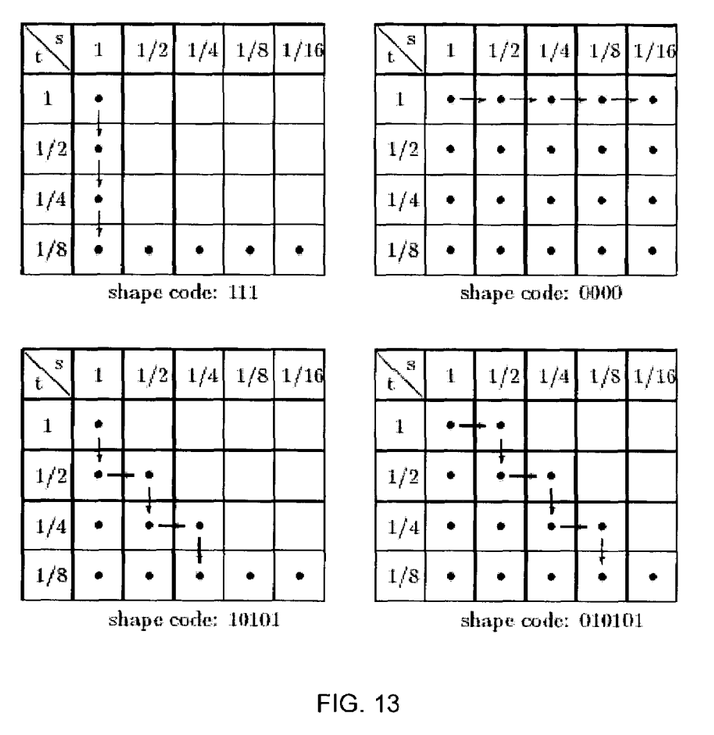
FIG. 13 illustrates shape code generation for ST-tables of various multi-resolution video representation schemes.

FIG. 13 shows four ST-tables and their corresponding codes describing the boundaries. FIG. 13(a) shows the shape code for the time-domain MCTF process of FIG. 6. FIG. 13(b) shows the shape code for the wavelet-domain MCTF process of FIG. 8. FIG. 13(c) shows the shape code for the alternative spatial/temporal filtering process (MCTF first) of FIG. 9(a). FIG. 13(d) shows the shape code for the alternative spatial/temporal filtering process (spatial wavelet first) of FIG. 9(b).

Note that the shape codes shown in FIG. 13 starts from the upper-left corner of the illustrated tables. However, a similar way of shape coding may start from the lower-right corner of the tables. Also, the shape coding directly corresponds to the intertwining pattern of two types of filtering in a video representation scheme, 1 representing a one-level spatial filtering and 0 representing a one-level MCTF.

4.5 Wavelet Video Coding with Subband MCTF

The effectiveness of MCTF in exploiting temporal redundancy in video coding has been shown by coders such as MC-EZBC and the fully scalable zerotree (FSZ) coder, which use pixel-domain MCTF. The FSZ coder is described by the following document: V. Bottreau, M. Benetiere, B. Felts, and B. Pesquet-Popescu, "A fully scalable 3d subband video codec," in Proceedings of *IEEE International Conference on Image Processing, ICIP*2001, Thessaloniki, Greece, Oct. 7-10 2001, vol. 2. No wavelet video coder with subband MCTF has been described. Wavelet video coding with subband-domain MCTF has many advantages over other approaches. This group of video coders represents a subband MCTF approach. A subband MCTF approach has not been seen in the literature.

Since a video sequence is decomposed in multiresolution along the spatial directions and the temporal direction, subband MCTF coders can easily provide spatial/temporal scalability with corresponding spatially scalable motion vectors. Also, subband MCTF coders can easily support quality scalability by using bitplane coding. The subband MCTF wavelet video coding framework is thus a candidate for universal scalable video coding.

However, subband MCTF approaches also have an evident disadvantage which is related to the wavelet-domain motion estimation/filtering. Not only the complexity of the motion estimation may increase, but the performance of the motion estimation/filtering in the wavelet domain may decrease. The inefficiency of motion estimation/filtering may thus decrease the coding performance of the in-band MCTF approaches.

5 Conclusions

From the foregoing, it can be seen that the present embodiments provide improved video coding methods and apparatus. Wavelet technology was previously established in still image coding, as it favorably combines high coding efficiency with additional advantages like scalability, efficient localized access etc. However, for video coding, motion compensation seems to be crucial to achieve high coding efficiency, especially at low bit rates. Therefore, incorporation of motion compensation into the wavelet image coding framework for video coding is a fundamental issue in wavelet video coding that is intended to achieve universal scalability and high coding efficiency at the same time.

There are two different ways to incorporate motion compensation into the wavelet image coding framework. Motion compensated temporal prediction (MCTP) coders have a recursive closed-loop structure and achieve temporal scalability by introducing B-frames. Motion compensated temporal filtering (MCTF) coders have a non-recursive open-loop structure and support flexible temporal scalability due to the multi-scale temporal decomposition. Both MCTP-type and MCTF-type coders may be further classified according to which domain, pixel- domain or wavelet-domain, MCTP or MCTF is applied. One advantage that both wavelet-domain MCTP coders and wavelet-domain MCTF coders have is the spatial scalability of motion vectors.

In other words, there are motion vectors corresponding to wavelet coefficients in each subband of wavelet decomposition. Multiresolution video representations generated with wavelet-domain MCTF are the subject of the present application. There are many different video representation schemes which separate spatial-direction decomposition and temporal decomposition but all generate multiresolution representation in the temporal direction and the spatial directions. The schemes in this family are determined by the pattern of intertwining of the spatial filtering and MCTF in the process of decomposing video signals. The major difference of the representation schemes is the availability of motion vectors that are needed in reconstruction of spatial resolution reduced video sequences. The feature that a representation scheme possesses related to the spatially scalable motion vectors determines the support of spatial/temporal scalability by the video representation scheme. Therefore, it is desirable to design a video representation in video coding to fulfill the requirements on scalability imposed by applications. The design of a video representation scheme based on specified scalability requirements was discussed herein. The first step of the design was to determine an ST-table based on the scalability requirements. Once the ST-table is formed, the spatial decomposition parameters or the temporal decomposition parameters can be used to easily construct the video representation or filtering process which possesses the desired property.

These two methods are essentially two ways to determine the intertwining pattern. One way is to determine the spatial decomposition level of the frames when a level of MCTF is applied. The other way is to determine the temporal decomposition level when a level of spatial filtering is applied.

The problem of how to encode the video representation was also considered. Since the two sets of parameters, spatial decomposition parameters and temporal decomposition parameters, can uniquely determine the filtering process, it is only necessary to transmit one of these two sets of parameters. These parameters essentially represent the numbers of bullets at each row or column in the ST-table. The representation scheme can also be coded by signifying the shape of the upper-right boundary of its ST-table.

While a particular embodiment of the present invention has been shown and described, modifications may be made. It is therefore intended in the appended claims to cover such changes and modifications which follow in the true spirit and scope of the invention.

The invention claimed is:

1. A method for determining multiresolution video representations for scalable video coding, the method comprising:
   performing subband motion compensated temporal filtering (MCTF) on input video signals, including performing a spatial decomposition on the input video signals, wherein motion vectors are available for subbands of the spatial decomposition; and
   obtaining a multiresolution representation of the filtered input video signals along both spatial directions and temporal direction,
   wherein spatial scalability is supported by video coders that use the multiresolution video representations, and, when combined with temporal scalability, is limitedly supported by video coders, depending on the representation that is used by the video coders, and further wherein combined spatial scalability and temporal scalability supported by a representation can be characterized by a spatial-temporal scalability (ST) table.

2. The method of claim 1 wherein the ST-table corresponding to a multiresolution representation is determined by the lowest spatial resolution parameters for every row of the ST-table.

3. The method of claim 1 wherein the ST-table corresponding to a multiresolution representation is determined by the lowest temporal resolution parameters for every column of the ST-table.

4. A method for determining multiresolution video representations for scalable video coding, the method comprising:
   performing subband motion compensated temporal filtering (MCTF) on input video signals, and
   obtaining a multiresolution representation of the filtered input video signals along both spatial directions and temporal direction,
   wherein the MCTF intertwines arbitrarily with spatial filtering to generate the multiresolution video representations, where the intertwining determines availability of spatially scalable motion vectors for support of combined spatial scalability and temporal scalability and the intertwining is critical for design of a video representation scheme to fulfill scalability requirements for a video coder,
   wherein the scalability requirements are signified by a spatial-temporal scalability (ST) table, and the intertwining of MCTF and spatial filtering may be determined by spatial decomposition parameters derived from the given ST-table.

5. The method of claim 4 wherein the spatial decomposition parameters are related to numbers of nonzero values at each row of an ST-table.

6. The method of claim 5 further comprising using the numbers of nonzero values at each row to code a video representation.

7. The method of claim 4 wherein the temporal decomposition parameters are related to numbers of nonzero values at each column of an ST-table.

8. The method of claim 7 further comprising using the numbers of nonzero values at each column to code a video representation.

9. A method for determining multiresolution video representations for scalable video coding, the method comprising:
   performing subband motion compensated temporal filtering (MCTF) on input video signals, and
   obtaining a multiresolution representation of the filtered input video signals along both spatial directions and temporal direction,
   wherein the MCTF intertwines arbitrarily with spatial filtering to generate the multiresolution video representations, where the intertwining determines availability of spatially scalable motion vectors for support of combined spatial scalability and temporal scalability, and the intertwining is critical for design of a video representation scheme to fulfill scalability requirements for a video coder,
   wherein the scalability requirements are signified by a spatial-temporal scalability (ST) table, and the intertwining of MCTF and spatial filtering may be determined by temporal decomposition parameters derived from the given ST-table.

10. The method of claim 9 further comprising coding the ST- table by data signifying an upper-right boundary of the ST-table.

11. The method of claim 10 wherein coding the ST- table comprises:
    identifying a staircase shape of the upper-right boundary of the ST-table, the staircase shape having vertical directions and horizontal directions; and
    coding the staircase shape with two symbols, 1 for the vertical directions and 0 for the horizontal directions.

12. The method of claim 11 wherein coding the ST- table comprises:
    coding the staircase shape starting from the upper-left corner of the upper-right boundary or from the lower-right corner of the upper-right boundary.

13. A family of multiresolution representations of video signals obtained by performing subband motion compensated temporal filtering (MCTF) for scalable video coding, the multiresolution representation of video signals being specified along two spatial directions and a temporal direction, wherein
- the multiresolution representations are obtained by performing MCTF subband by subband for a spatial decomposition on the video signals,
- subband MCTF requires spatially scalable motion vectors for subbands of the spatial decomposition,
- the spatially scalable motion vectors are critical for reconstruction of spatial resolution reduced video signals, and is supported by video coders that use the multiresolution video representations,
- the spatial scalability, when combined with temporal scalability, is limitedly supported by video coders, depending on a video representation that is used by the video coders, and further wherein the combined spatial scalability and temporal scalability supported by the video representation is characterized by a spatial-temporal scalability (ST) table.

14. The family of multiresolution video representations of claim 13, wherein ST- tables corresponding to the multiresolution representations are determined by lowest spatial resolution parameters for every row of the table.

15. The family of multiresolution video representations of claim 13, wherein ST- tables corresponding to the multiresolution representations are determined by the lowest temporal resolution parameters for every column of the table.

16. A family of multiresolution representations of video signals obtained by performing subband motion compensated temporal filtering (MCTF) for scalable video coding, the multiresolution representation of video signals being specified along two spatial directions and a temporal direction, wherein the MCTF intertwines arbitrarily with spatial filtering to generate the family of video representations, and the intertwining patterns determine the availability of spatially scalable motion vectors for support of combined spatial scalability and temporal scalability, and further wherein scalability requirements for a video coder are signified by a spatial-temporal (SI) table, and wherein the intertwining patterns of MCTF and spatial filtering may be determined by one of spatial decomposition parameters and temporal decomposition parameters derived from the given ST-table.

17. The family of multiresolution video representations of claim 16 wherein the spatial decomposition parameters are related to numbers of nonzero values at each row of an ST-table.

18. The family of multiresolution video representations of claim 17 wherein the numbers of bullets at each row are used to code a specified video representation.

19. The family of multiresolution video representations of claim 16, wherein the temporal decomposition parameters are related to numbers of nonzero values at each column of an ST-table.

20. The family of multiresolution video representations of claim 19 wherein the numbers of bullets at each column are used to code the video representation scheme.

21. The family of multiresolution video representations of claim 16 wherein the ST- table is coded by data related to an upper-right boundary having a staircase shape of the ST-table.

22. The family of multiresolution video representations of claim 21 wherein the staircase shape is coded with a first symbol for vertical direction and a second symbol for horizontal direction.

23. The family of multiresolution video representations of claim 22 wherein the staircase shape is coded starting from an upper left corner of the upper-right boundary of the ST-table or from a lower-right corner of the upper-right boundary of the ST-table.

* * * * *